US012583002B2

(12) United States Patent
Martin et al.

(10) Patent No.: US 12,583,002 B2
(45) Date of Patent: Mar. 24, 2026

(54) COATING AGENT PUMP, COATING INSTALLATION AND ASSOCIATED OPERATING METHOD

(71) Applicant: Dürr Systems AG, Bietigheim-Bissingen (DE)

(72) Inventors: Herbert Martin, Weinstadt-Grossheppach (DE); Erhard Kubach, Hardthausen (DE); Manfred Michelfelder, Steinheim (DE)

( * ) Notice: Subject to any disclaimer, the term of this patent is extended or adjusted under 35 U.S.C. 154(b) by 625 days.

(21) Appl. No.: 17/916,888

(22) PCT Filed: Apr. 6, 2021

(86) PCT No.: PCT/EP2021/058845

§ 371 (c)(1),
(2) Date: Oct. 4, 2022

(87) PCT Pub. No.: WO2021/204748

PCT Pub. Date: Oct. 14, 2021

(65) Prior Publication Data

US 2023/0158525 A1 May 25, 2023

(30) Foreign Application Priority Data

Apr. 9, 2020 (DE) ........................ 102020109973.8

(51) Int. Cl.
*B05B 9/04* (2006.01)
*B05B 15/55* (2018.01)
(Continued)

(52) U.S. Cl.
CPC ............ *B05B 9/0409* (2013.01); *B05B 15/55* (2018.02); *B05B 15/58* (2018.02); *F04B 43/026* (2013.01)

(58) Field of Classification Search
CPC ... B05B 9/0409; B05B 15/55; F04B 43/0736; F04B 43/026
See application file for complete search history.

(56) References Cited

U.S. PATENT DOCUMENTS

| | | | |
|---|---|---|---|
| 5,096,120 A | 3/1992 | Luckarz | |
| 5,649,809 A * | 7/1997 | Stapelfeldt | F04B 43/026 92/138 |

(Continued)

FOREIGN PATENT DOCUMENTS

| | | |
|---|---|---|
| CN | 110142172 A | 8/2019 |
| DE | 102 25 681 A1 | 1/2004 |

(Continued)

OTHER PUBLICATIONS

International Search Report and Written Opinion for PCT/EP2021/058845 mailed Jun. 28, 2021 (12 pages; with English translation).

(Continued)

*Primary Examiner* — Kenneth J Hansen
(74) *Attorney, Agent, or Firm* — Taft Stettinius & Hollister LLP; Thomas E. Bejin; John W. Carpenter

(57) ABSTRACT

The disclosure relates to a coating agent pump for conveying a coating agent in a coating installation, having a pump inlet, an inlet section, a pump outlet and an outlet section. The coating agent pump according to the disclosure additionally has an outlet-side circulation connection for discharging the coating agent into a circulation line that leads back to a paint supply. Furthermore, the disclosure comprises a corresponding coating installation and an associated operating method.

6 Claims, 11 Drawing Sheets

(51) Int. Cl.

| | |
|---|---|
| ***B05B 15/58*** | (2018.01) |
| ***F04B 43/02*** | (2006.01) |

(56) References Cited

U.S. PATENT DOCUMENTS

| | | | | |
|---|---|---|---|---|
| 7,066,186 | B2 | 6/2006 | Bahr | |
| 7,117,877 | B2 | 10/2006 | Bahr | |
| 9,662,673 | B2 | 5/2017 | Schenke et al. | |
| 2003/0041884 | A1 | 3/2003 | Bahr | |
| 2004/0016448 | A1* | 1/2004 | Ullrey | B08B 9/0325 134/102.1 |
| 2005/0139237 | A1 | 6/2005 | Bahr | |
| 2006/0114303 | A1* | 6/2006 | Telljohann | B41F 31/027 347/89 |
| 2013/0115117 | A1 | 5/2013 | Gonzalez-Moratiel Alvarez | |
| 2015/0375249 | A1* | 12/2015 | Schenke | F04B 43/0736 222/1 |
| 2016/0032919 | A1 | 2/2016 | Bazan | |

FOREIGN PATENT DOCUMENTS

| | | | |
|---|---|---|---|
| DE | 10 2006 041 677 | A1 | 3/2008 |
| DE | 10 2013 003 620 | A1 | 8/2014 |
| DE | 10 2017 126 651 | A1 | 5/2019 |
| EP | 1284162 | A1 | 2/2003 |
| EP | 2735739 | A2 | 5/2014 |
| EP | 3725527 | A1 | 10/2020 |

OTHER PUBLICATIONS

German Patent and Trademark Office - Office Action for Application No. DE 10 2020 109 973.8 mailed Dec. 1, 2020 (26 pages; with English machine translation).

Chinese Patent and Trademark Office—Office Action and Search Report for related application No. 202180024980.7 mailed Dec. 3, 2025 (10 pages; with English translation of Search Report).

* cited by examiner

COATING AGENT PUMP, COATING INSTALLATION AND ASSOCIATED OPERATING METHOD

CROSS-REFERENCE TO RELATED APPLICATIONS

This application is a national stage of, and claims priority to, Patent Cooperation Treaty Application No. PCT/EP2021/058845, filed on Apr. 6, 2021, which application claims priority to German Application No. DE 10 2020 109 973.8, filed on Apr. 9, 2020, which applications are hereby incorporated herein by reference in their entireties.

BACKGROUND

The disclosure relates to a coating agent pump for conveying a coating agent (e.g. paint) in a coating installation, in particular in a painting system for painting motor vehicle body components. Furthermore, the disclosure comprises a corresponding coating installation and an associated operating method.

FIG. 1 shows a schematic representation of a conventional coating installation which can be used, for example, for painting motor vehicle body components.

This known coating installation has first of all a pigging station 1, which supplies an applicator (e.g. rotary atomizer) with coating agent via several piggable supply lines 2. Several central lines 3 run in the pigging station 1, although only three central lines 3 are shown in the drawing as an example. Different colored coating agents can be supplied via the central lines 3. In the pigging station 1 there are several coating agent valves, which make it possible to connect the outgoing supply lines 2 selectively with one of the central lines 3, as is known per se from the state of the art.

In the drawing, the central line 3 of the pigging station 1 is connected to a coating agent pump 5 via a pressure line 4, as is known, for example, from DE 10 2013 003 620 A1. The coating agent pump 5 draws in the coating agent to be applied via a suction line 6 from a paint supply 7, which is shown here only schematically and has a coating agent container. The two other central lines 3 of the pigging station 1 are supplied in the same way via pressure lines, but as not shown here for simplification.

In addition, the pigging station 1 has a circulation module 8 with circulation connections 9 and circulation valves not shown. A circulation line 10 is connected to the recirculation connections 9, which leads back to the paint supply 7 and enables recirculation operation. The recirculation valves of the recirculation module 8 enable the central lines 3 of the pigging station 1 to be optionally connected to the circulation line 10.

Furthermore, the pigging station 1 contains a return module 11 with return connections 12 and return valves not shown. The recirculation module 11 is connected to a recirculation line 13, which leads to a dirt thinner receptacle 14 and enables the recirculation of residual coating agent and rinsing agent.

It has already been briefly mentioned above that the coating agent pump 5 can, for example, be designed in accordance with the disclosure document DE 10 2013 003 620 A1. This means, among other things, that the coating agent pump 5 is driven pneumatically. For this purpose, a control line 15 opens into the coating agent pump 5.

In addition, a blow-out line 16 opens into the coating agent pump via a blow-out valve 17 designed as a non-return valve, as is also already known from DE 10 2013 003 620 A1.

During a color change, the pressure line 4 and the circulation line 10 must be blown out and flushed out over their entire line length. As a result, high color change losses occur during a color change, since only little coating agent can be recovered. In addition, a color change also requires a large consumption of rinsing agent when flushing out the pressure line 4 and the circulation line 10.

During a color change, the coating agent pump 5 and the pressure line 4 must then be pressed on (i.e. filled) with the new coating agent. This pressing-on with the new coating agent requires a certain pressing-on time depending on the line length of the pressure line 4 and the viscosity of the coating agent. For example, the press-on time can be 2-4 seconds if the line length of the pressure line 4 is L=2 m. On the other hand, if the line length of the pressure line 4 is L=8 m, the press-on time may already be 10-18 seconds.

For the supply of the pigging station 1, it is necessary that all components of the coating installation are filled with coating agent without bubbles, i.e., among others, the coating agent pump 5, the pressure line 4, the pigging station 1 and the circulation line 10. Depending on the line lengths and the viscosity of the coating agent, this results in different times and a different volume of coating agent required to fill the coating installation with the coating agent. During a color change, these components are emptied via the coating agent pump 5, for which purpose the coating agent pump 5 has a residual emptying and an outlet function. Due to the arrangement of the pressure line 4 and the circulation line 10, however, larger quantities of the coating agent remain in the individual components of the coating installation. Subsequently, the components of the coating installation are rinsed, for which larger quantities of rinsing agent are required due to the arrangement of the pressure line 4 and the circulation line 10. Due to the blowing out, solvent (rinsing agent) remains in the components of the coating installation. As a result, more coating agent has to be pressed on via the pigging station 1 and the recirculation line 13 in order to remove the solvent (rinsing agent) still remaining in the coating installation from the components of the coating installation and to transfer it to the dirt thinner receptacle 14. The consequence of this is that several pump strokes of, for example, 3-6 pump strokes are required, resulting in an additional loss of coating agent, such as 75 ml per pump stroke.

The above-described known coating installation thus has various disadvantages, which are briefly summarized again below.

For a color change, the pressure line 4 and the circulation line 10 must be completely filled with coating agent. However, the circulation line 10 can only be filled via the pigging station 1. This results in correspondingly long lines with an increased line volume and corresponding losses of coating agent.

With the residual emptying and the blow-out function of the coating agent pump 5, the pressure line 4 and the circulation line 10 are emptied. However, due to the process, a high proportion of the coating agent still remains in the lines. For example, 20% of the coating agent can still remain in the pressure line 4, while as much as 80% of the coating agent can still remain in the circulation line 10.

Furthermore, during a rinsing process, a residual amount of the rinsing agent still remains in the coating agent pump 5, since it is not possible to completely remove the rinsing agent from the coating agent pump 5 due to the arrangement of the components of the coating installation. As a result, the remaining rinsing agent must be pushed into the return line 13 with the newly pressed-on coating agent. This increases the loss of coating agent for pushing the rinsing agent back into the return line 13 when filling with the new coating agent.

Finally, the press-on time required for pressing on with a new coating agent depends on the viscosity of the coating agent. In addition, the coating agent losses when pressing on with a new coating agent also depend on the viscosity of the former coating agent.

Furthermore, with respect to the general technical background of the disclosure, reference should also be made to EP 3 725 527 A1. This publication discloses a pump system for supplying a printing machine. However, a coating agent pump in the sense of the disclosure is not known from this publication.

Furthermore, with regard to the state of the art, reference should also be made to DE 10 2017 126 651 A1. This publication discloses a coating agent pump. However, this known coating agent pump suffers from the same problems as the above-mentioned known coating agent pump according to DE 10 2013 003 620 A1.

Finally, the publications DE 102 25 681 A1 and EP 2 735 739 A2 should also be mentioned, but these only concern the general technical background of the disclosure.

DETAILED DESCRIPTION

Figure 1:
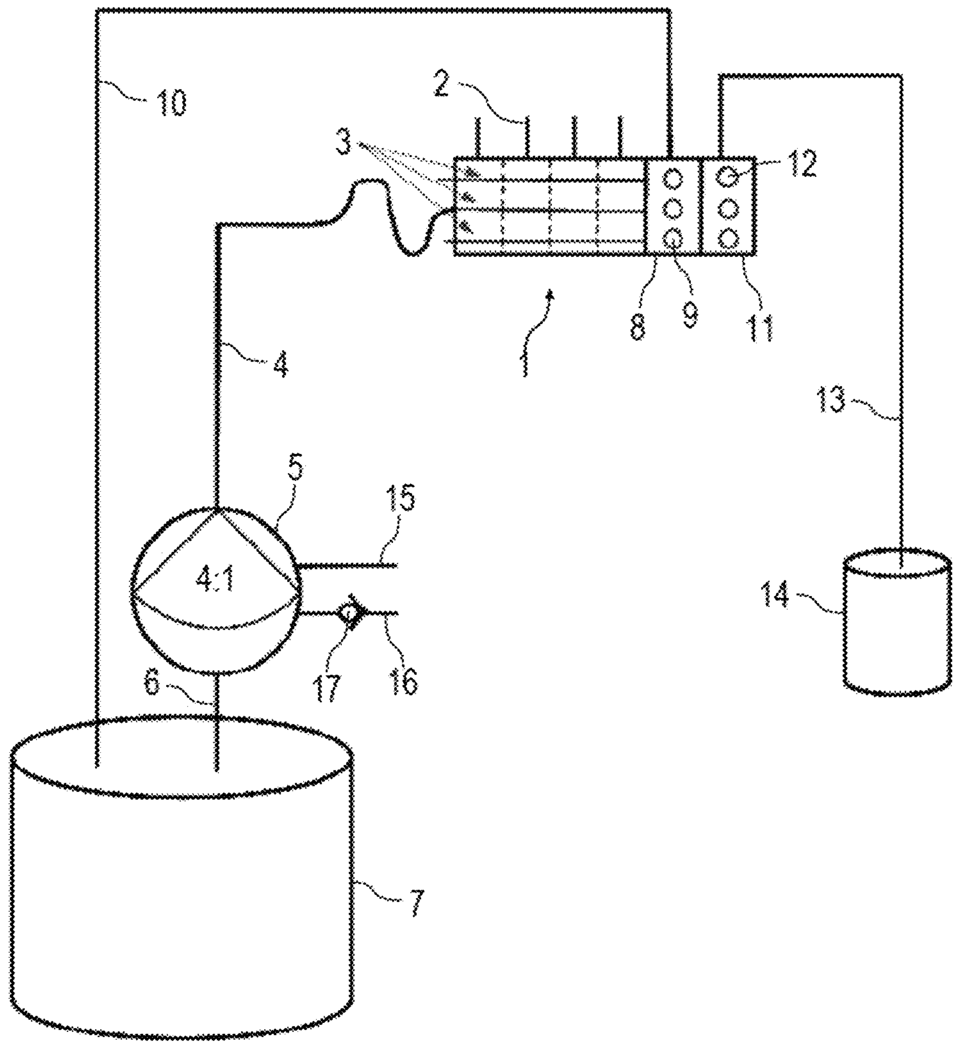
Fig. 1 Prior art
FIG. 1 shows a schematic representation of a conventional coating installation as described at the beginning.

The disclosure is based on the task of creating a correspondingly improved coating agent pump, a correspondingly improved coating installation and an associated operating method.

First of all, the disclosure comprises a coating agent pump which partly corresponds to the known coating agent pump according to DE 10 2013 003 620 A1 described at the beginning, so that reference is also made to this publication in order to avoid repetition.

The coating agent pump according to the disclosure is generally suitable for conveying a coating agent, such as a paint. However, the disclosure is not limited to paints with respect to the type of coating agent to be conveyed, but can in principle also be implemented with other types of coating agents.

Furthermore, it should be mentioned that the coating agent pump according to the disclosure is preferably adapted for use in a painting system for painting motor vehicle body components. However, the coating agent pump according to the disclosure can in principle also be used in other systems for conveying coating agents.

In accordance with the known coating agent pump according to DE 10 2013 003 620 A1 described at the beginning, the coating agent pump according to the disclosure has a pump inlet at which the coating agent to be conveyed is fed. For example, the pump inlet of the coating agent pump can be connected to a paint supply via a suction line.

The pump inlet of the coating agent pump according to the disclosure opens into an inlet section within the coating agent pump, which is fed with the coating agent from the pump inlet.

Furthermore, in accordance with the known coating agent pump described at the beginning according to DE 10 2013 003 620 A1, the coating agent pump according to the disclosure has a pump outlet at which the coating agent to be conveyed is discharged. For example, the pressure line described at the beginning can be connected to the pump outlet. Within the coating agent pump according to the disclosure, there is here an outlet section which feeds the pump outlet with the coating agent to be conveyed.

In this respect, the coating agent pump according to the disclosure corresponds to the known coating agent pump described at the beginning according to DE 10 2013 003 620 A1. The disclosure is now based on the realization that the problems of the known coating installation described above are due to the fact that the circulation line starts from the pigging station, since in this way the pressure line and the circulation line have to be flushed over their entire length, blown out and filled with new coating agent during a color change.

The coating agent pump according to the disclosure is therefore characterized by an outlet-side circulation connection to which the circulation line can be connected in order to return coating agent to a paint supply during a color change. It should be mentioned here that the circulation connection of the coating agent pump is provided in addition to the pump inlet and the pump outlet. Thus, in addition to the pump inlet and the pump outlet, the coating agent pump according to the disclosure has at least one further additional connection in the form of the circulation connection. This circulation connection is connected to the outlet section of the coating agent pump and is fed from the outlet section of the coating agent pump with the coating agent to be returned.

Furthermore, the coating agent pump according to the disclosure preferably has a controllable circulation valve integrated into the coating agent pump to control the coating agent flow from the outlet section of the coating agent pump through the circulation connection into the circulation line.

This design of the coating agent pump according to the disclosure allows the circulation line to branch off far upstream of the pigging station, namely directly from the coating agent pump. This offers the advantage that the circulation line is relatively short, resulting in correspondingly low color change losses. In this way, the line lengths can be shortened by 50-90%, which leads to a correspondingly large reduction in coating agent losses.

In a preferred embodiment of the disclosure, the coating agent pump additionally has a return connection on the outlet side, which makes it possible to return residues of the coating agent and/or of a rinsing agent into a return line that leads into a dirt thinner receptacle. This return connection is in addition to the pump outlet, the pump inlet, and the circulation connection and is connected to the coating agent pump outlet section. Thus, the return connection of the coating agent pump is fed with the coating agent or rinsing agent to be returned from the outlet section of the coating agent pump.

Furthermore, the return connection preferably has a controllable return valve integrated into the coating agent pump to control the flow of coating agent from the outlet section of the coating agent pump through the return connection into the return line to the dirt thinner receptacle.

The term controllable valve, as used in the context of the disclosure, is to be distinguished from intrinsically fluid actuated valves, such as check valves, in which the valve position is determined by the pressure at the inlet and outlet of the valve. For example, such controllable valves can be controlled electromagnetically or pneumatically, as is known from the prior art.

The coating agent pump according to the disclosure can be constructed in a fundamentally similar manner to the coating agent pump known from DE 10 2013 003 620 A1. Thus, the coating agent pump according to the disclosure is preferably a positive displacement pump, which can be designed, for example, as a diaphragm pump and preferably as a double diaphragm pump.

Thus, the coating agent pump according to the disclosure preferably has a pump chamber, wherein the inlet section and the outlet section of the coating agent pump are connected to the pump chamber.

A movable displacer, for example in the form of a diaphragm, is located in the pump chamber, as is known from DE 10 2013 003 620 A1.

Furthermore, the coating agent pump according to the disclosure comprises a drive for moving the displacer (e.g. diaphragm) for pumping the coating agent. For example, this drive can be designed as a pneumatic or electric drive.

Between the inlet section of the coating agent pump and the pump chamber there is an inlet valve integrated in the coating agent pump, which is preferably designed as a check valve and releases a coating agent flow from the inlet section into the pump chamber, whereas an oppositely directed coating agent flow from the pump chamber into the inlet section is blocked by the check valve. Such a check valve preferably has a tension spring, a valve body (e.g. valve ball) and a valve seat, the tension spring pressing the valve body sealingly into the valve seat in a closed position.

Furthermore, the coating agent pump according to the disclosure preferably has an outlet valve integrated in the coating agent pump between the pump chamber and the pump outlet, wherein the outlet valve is also preferably designed as a check valve. This means that the check valve releases a coating agent flow from the pump chamber into the outlet section, whereas an oppositely directed coating agent flow from the outlet section into the pump chamber is blocked. This check valve also preferably has a tension spring, a valve body (e.g. valve ball) and a valve seat, the tension spring pressing the valve body sealingly into the valve seat in a closed position.

Furthermore, the coating agent pump according to the disclosure also preferably has a first blow-out connection which is used to blow out the pump chamber with compressed air. The first blow-out connection therefore preferably opens into the pump chamber, as is already known per se from DE 10 2013 003 620 A1. In the preferred embodiment of the disclosure, the first blow-out connection opens into the pump chamber via the inlet valve designed as a check valve. During normal coating operation, the coating agent flows in a certain predetermined flow direction through the inlet valve from the inlet section through the inlet valve into the pump chamber of the coating agent pump. With respect to this normal flow direction during coating operation, the first blow-out connection preferably opens into the inlet valve downstream of the valve seat. This means that the pump chamber can be blown-out via the first blow-out connection while the inlet valve is closed.

In the preferred embodiment of the disclosure, the first blow-out connection is associated with a first blow-out valve, which is preferably integrated in the coating agent pump and controls the flow of compressed air through the first blow-out connection into the pump chamber during blow-out. This first blow-out valve is preferably designed as a check valve, which releases a compressed air flow through the first blow-out connection into the pump chamber and blocks an oppositely directed compressed air flow from the pump chamber through the first blow-out connection. However, it is alternatively possible for the first blow-out valve to be a controllable valve such that the valve position of the first blow-out valve is then controllable independently of the pressure conditions at the inlet and outlet of the first blow-out valve.

Furthermore, the coating agent pump preferably additionally has an inlet-side second blow-out connection for blowing coating agent out of the inlet section of the coating agent pump by means of compressed air. In this way, the coating agent located in the inlet section of the coating agent pump can be blown back through the pump inlet to the paint supply by supplying compressed air through the second blow-out connection on the inlet side.

Preferably, the second blow-out connection is associated with a controllable second blow-out valve, which is preferably integrated in the coating agent pump and controls the compressed air flow through the second blow-out connection into the inlet section of the coating agent pump.

In the preferred embodiment of the disclosure, the coating agent pump is designed as a double diaphragm pump and thus has two pump chambers, two inlet valves, two outlet valves and two movably driven diaphragms, each of which is arranged in one of the two pump chambers. In this case, two of the first blow-out connections can be provided to blow-out one of the two pump chambers, respectively.

The double diaphragm pump preferably has a pump housing with two opposing housing covers. It is advantageous if the following components are structurally integrated in each of the two housing covers:

One of the two inlet valves
one of the two outlet valves,
one of the two first blow-out valves,
the recirculation valve or the return valve, and/or
the two second blow-out valves.

It should be mentioned here that the two housing covers are preferably cast parts, which are preferably made of stainless steel.

In addition to the coating agent pump according to the disclosure described above, the disclosure also comprises a coating installation which also includes an optimized arrangement of the circulation line.

First of all, in accordance with the known coating installations, the coating installation according to the disclosure has a paint supply which provides the coating agent to be applied and contains, for example, a coating agent container.

In addition, the coating installation according to the disclosure also has a coating agent pump for conveying the coating agent from the paint supply in the direction of the applicators. For example, the coating agent pump may be of the type described above in accordance with the disclosure. However, it is also possible within the scope of the disclosure for the coating agent pump to be designed in a conventional manner, as is known, for example, from DE 10 2013 003 620 A1.

In this case, the coating agent pump feeds a pressure line that originates from the coating agent pump.

In addition, the coating installation according to the disclosure comprises a tapping point which is connected to the pressure line and is fed with the coating agent from the pressure line. In normal coating operation, the coating agent thus flows in a predetermined flow direction from the coating agent pump through the pressure line to the tapping point.

In the preferred embodiment of the disclosure, the tapping point is designed as a pigging station and feeds at least one piggable supply line that originates from the pigging station and leads to an application device that applies the coating agent. However, it is not mandatory within the scope of the disclosure that the tapping point comprises a pigging station.

In addition, the coating installation according to the disclosure also comprises a circulation line which leads back to the paint supply and allows recovery of coating agent during a rinsing process.

The coating installation according to the disclosure is now distinguished by an arrangement of the circulation line, which no longer starts from the tapping point, but branches off upstream of the tapping point with respect to the normal flow direction in coating operation. This reflects the same inventive idea as in the coating agent pump described at the beginning, in which the circulation line branches off directly from the coating agent pump. In both cases (branching of the circulation line directly from the coating agent pump or from the pressure line), the line length of the circulation line is shortened, which reduces the losses during a color change.

When the coating agent pump according to the disclosure is used in the coating installation according to the disclosure, the circulation line preferably discharges directly from the circulation connection of the coating agent pump.

When using a conventional coating agent pump according to DE 10 2013 003 620 A1, on the other hand, the circulation line branches off from the pressure line at a branching point between the tapping point and the coating agent pump. In this case, there is preferably only a relatively short line length of at most 5 m, 2 m, 1 m, 65 cm or 50 cm between the coating agent pump and the branching point.

In the coating installation according to the disclosure, there is preferably a controllable circulation valve in the circulation line for controlling the coating agent flow through the circulation line. If the circulation line branches off directly from the coating agent pump, this circulation valve is preferably also integrated in the coating agent pump. Otherwise, on the other hand, the controllable circulation valve is separate from the coating agent pump.

The coating installation according to the disclosure preferably also has a dirt thinner receptacle, as is known per se from the prior art and serves to receive and dispose of residues of the coating agent and a rinsing agent. This dirt thinner receptacle is preferably fed by a first return line leading to the dirt thinner receptacle. For example, this first return line can branch off from an outlet-side return connection of the coating agent pump, as mentioned above in the description of the coating agent pump according to the disclosure. Alternatively, it is possible for the first return line to branch off from the pressure line between the coating agent pump and the tapping point.

Furthermore, the coating installation according to the disclosure also preferably has a second return line which leads from the tapping point to the dirt thinner receptacle.

The coating installation according to the disclosure can thus have two return lines, where the first return line branches off upstream of the tapping point, for example directly from an outlet-side return connection of the coating agent pump, while the second return line starts from the tapping point.

A controllable return valve is preferably provided in the first return line to control the flow of fluid through the first return line into the dirt thinner receptacle. This return valve is preferably integrated into the coating agent pump.

It has already been mentioned above in the description of the coating agent pump according to the disclosure that it can have a first blow-out connection in order to blow out the pump chamber with compressed air, as is already known per se from DE 10 2013 003 620 A1.

In the coating agent pump, this first blow-out connection preferably opens into the pump chamber via the inlet valve designed as a non-return valve. It is advantageous if the compressed air supplied via the first blow-out connection presses the valve body of the inlet valve, which is designed as a non-return valve, into the closed position. The compressed air supplied via the first blow-out connection thus contributes to closing the inlet valve and enters the pump chamber to blow it out. Here, it is advantageous if the coating agent pump has at least a first blow-out valve to control the flow of compressed air through the first blow-out connection into the pump chamber.

This first blow-out valve can, for example, be designed as a check valve that releases a compressed air flow through the first blow-out connection into the pump chamber, whereas an oppositely directed compressed air flow from the pump chamber is blocked by the first blow-out connection. In the coating installation according to the disclosure, a first blow-out line is preferably connected to the first blow-out connection of the coating agent pump in order to blow in compressed air.

Furthermore, it has already been mentioned above in the description of the coating agent pump according to the disclosure that it can have a second blow-out connection on the inlet side for blowing coating agent out of the inlet section of the coating agent pump, whereby the coating agent contained therein can then be fed back through the pump inlet to the paint supply. The control of the compressed air flow through the second blow-out connection is here preferably effected by a second blow-out valve, as already described above.

The arrangement of the circulation line according to the disclosure enables a relatively short line length of the circulation line, which is associated with correspondingly low coating agent losses. For example, the circulation line can have a line length of at most 2 m, 1 m, 50 cm or 25 cm.

Furthermore, it should be mentioned that the coating agent pump is preferably pneumatically driven with compressed air, the compressed air having a certain drive air pressure, while the coating agent is conveyed with a certain delivery pressure. The coating agent pump preferably allows a transmission ratio between the delivery pressure and the drive air pressure, wherein this transmission ratio can be, for example, at least 2:1, 3:1 or 4:1.

It has already been briefly mentioned above that the coating agent pump according to the disclosure is preferably a diaphragm pump, such as a double diaphragm pump. However, the disclosure is not limited to diaphragm pumps with respect to the type of coating agent pump.

It should also be mentioned that the coating agent pump according to the disclosure preferably has at least one pneumatically driven drive piston, whereby two drive pistons can be provided in the case of a double diaphragm pump.

Furthermore, it should be mentioned that the tapping point can be designed, for example, as a pigging station and can feed several supply lines, each of which leads to an application device (e.g. rotary atomizer) and supplies the respective application device with the coating agent to be applied.

In addition, the tapping point can have at least one compressed air connection and at least one controllable compressed air valve in order to be able to feed compressed air into the pressure line at the tapping point. Preferably, the compressed air is also fed in as pulse air. For this purpose, the tapping point can have a compressed air module that has several compressed air connections and several compressed air valves for the various central lines of the tapping point.

Furthermore, the tapping point can have a return connection for connecting the second return line and a controllable return valve for controlling the return. Again, the tapping point may have a return module having a plurality of return connections and a plurality of return valves for the various central lines of the tapping point.

The tapping point can thus have several central lines, each of which is fed with the coating agent from a pressure line, as has already been briefly described above.

In addition to the coating agent pump according to the disclosure described above and the coating installation according to the disclosure also described above, the disclosure also comprises an associated operating method.

Within the scope of the operating method according to the disclosure, among other things, the circulation valve is opened in order to be able to return coating agent residues through the circulation line into the paint supply. For this purpose, compressed air (e.g. pulsed air) is then introduced into the pressure line at the tapping point. The coating agent in the pressure line is then pushed back along the pressure line by means of compressed air and then passes through the open circulation valve back to the paint supply through the circulation line.

Furthermore, during a rinsing process in the operating method according to the disclosure, the return valve of the first return line can be opened, which branches off either directly from the coating agent pump or between the coating agent pump and the tapping point. At the tapping point, compressed air (e.g. pulsed air) is then introduced into the pressure line, whereby residual quantities of rinsing agent and/or coating agent from the pressure line and/or from the outlet section of the coating agent pump are pushed by means of the compressed air through the first return line into the dirt thinner receptacle.

Preferably, these processes are carried out one after the other. First, preferably, the coating agent in the pressure line is fed back into the paint supply via the recirculation line. Then, residues of the coating agent and, if necessary, of rinsing agent are transferred from the pressure line through the first return line into the dirt thinner receptacle.

In addition, coating agent residues may remain in the pump chamber of the coating agent pump during a rinsing process. These coating agent residues can also be at least partially recovered as part of the operating method according to the disclosure. For this purpose, the circulation valve is opened to allow the coating agent residues to be returned through the circulation line to the paint supply. Compressed air (e.g. pulse air) is then introduced into the pump chamber of the coating agent pump via the first blow-out line through the first inlet valve, which is designed as a non-return valve. The coating agent in the coating agent pump is then pushed back into the paint supply by means of the supplied compressed air through the circulation line.

Furthermore, during a rinsing process, coating agent residues can also remain in the inlet section of the coating agent pump. In the operating method according to the disclosure, these coating agent residues can also be at least partially recovered. For this purpose, compressed air is injected through the second blow-out line into the second blow-out connection of the coating agent pump and from there reaches the inlet section of the coating agent pump. The coating agent located in the inlet section of the coating agent pump can thus be pushed back to the paint supply by means of the supplied compressed air through the pump inlet.

The sub-processes described above can be carried out one after another during a rinsing process, and preferably in the following order:

Step 1:
Blowing out the coating agent in the pressure line through the circulation line back to the paint supply.

Step 2:
Blowing out the coating agent remaining in the pump chamber through the circulation line back into the paint supply.

Step 3:
Blowing out the coating agent remaining in the inlet section of the coating agent pump 5 through the pump inlet back into the paint supply.

Step 4:
Blowing out residual coating agent and rinsing agent from the pressure line through the return line into the dirt thinner receptacle.

However, within the scope of the disclosure, a different sequence of sub-processes is also possible. By way of example, the following possible sequences of the above-mentioned steps 1-4 can be named:

Step 1→Step 3→Step 2→Step 4.
Step 2→Step 1→Step 3→Step 4.
Step 2→Step 3→Step 1→Step 4.
Step 3→Step 1→Step 2→Step 4.
Step 3→Step 2→Step 1→Step 4.

Thus, in the operating method according to the disclosure, the flow through the pressure line can be bidirectional. During normal coating operation, the respective coating agent flows from the coating agent pump through the pressure line to the discharge point, from where the coating agent then finally reaches the applicators. During a rinsing process, on the other hand, the coating agent flows in the opposite direction from the tapping point back to the coating agent pump and from there through the circulation line back to the paint supply.

Figure 2:
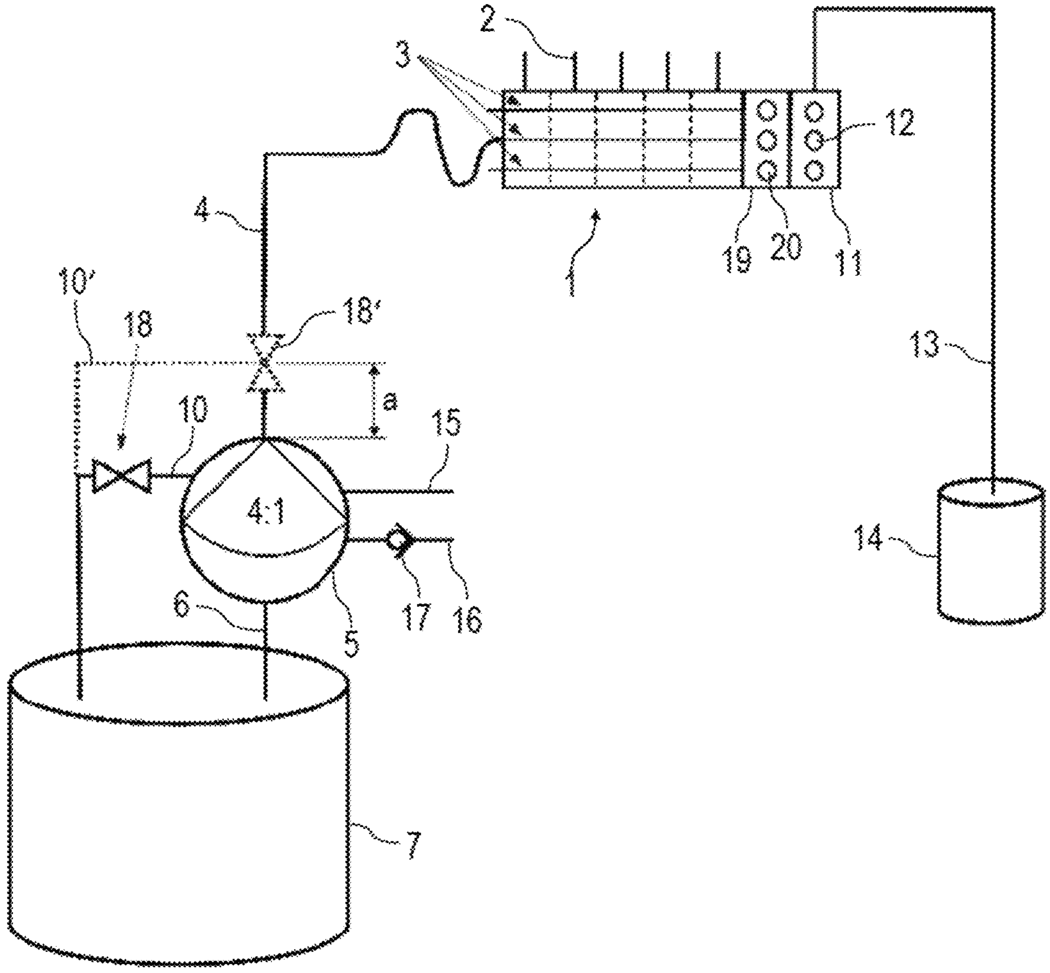
FIG. 2 shows a schematic representation of a coating installation according to the disclosure, in which the circulation line optionally branches off directly from the coating agent pump or from the pressure line between the coating agent pump and the tapping point.

In the following, the example of a coating installation according to the disclosure as shown in FIG. 2 will be described. This embodiment corresponds in part to the known coating installation described at the beginning and shown in FIG. 1. To avoid repetition, reference is therefore made to the above description of FIG. 1, where the same reference signs are used for corresponding details.

A special feature of the coating installation according to the disclosure as shown in FIG. 2 is that the circulation line 10 or 10' does not start from the pigging station 1, but branches off upstream of the pigging station 1 with respect to the normal flow direction in coating operation.

The drawings show two variants of the routing of the circulation line 10 or 10'.

In a first disclosure variant shown in dashed lines, the circulation line 10' branches off from the pressure line 4 at a branch point, the branch point being formed by a circulation valve 18'. It should be mentioned here that the pressure line 4 between the coating agent pump 5 and the circulation valve 18' or the branch point located there has only a relatively small line length a, which can be less than 1 m, for example.

In a second disclosure variant shown with solid lines, on the other hand, the circulation line 10 branches off directly from the coating agent pump 5, which has a separate circulation connection for this purpose, as will be described in detail.

In both variants of the disclosure, the circulation line 10 or 10' has a substantially shorter line length than in the known coating installation according to FIG. 1. In the event of a color change, the coating agent in the pressure line 4 can be fed back into the paint supply 7 via the circulation line 10 or 10', thus reducing coating agent losses.

For this purpose, the pigging station 1 has a compressed air module 19 with several compressed air connections 20 instead of the return module 8. Compressed air lines can be connected to the compressed air connections 20 in order to feed compressed air into the central lines 3 of the pigging station 1. When compressed air is introduced into the pressure line 4, the coating agent in the pressure line 4 is then pushed back into the paint supply 7 via the circulation line 10 or 10' and thus recovered.

Figure 3:
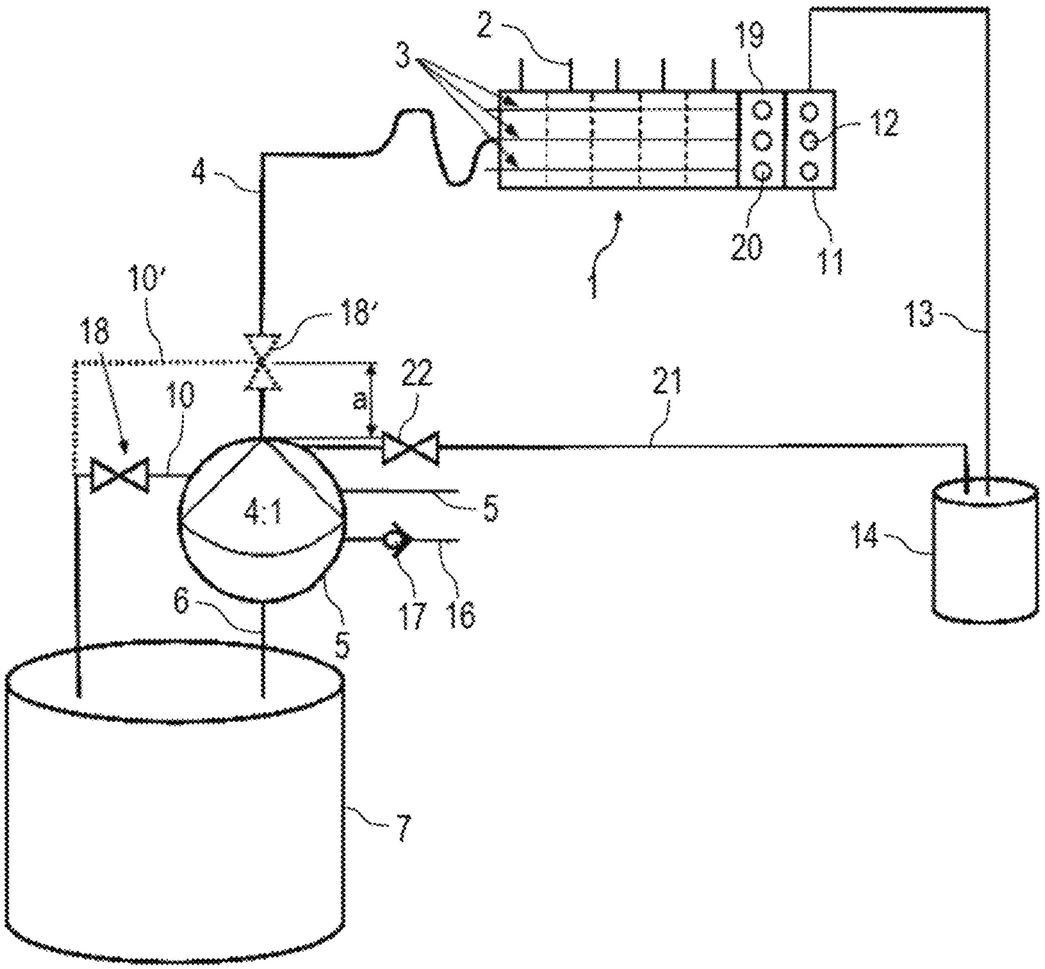
FIG. 3 shows a modification of FIG. 2 with an additional recirculation line which starts directly from the coating agent pump and leads into a dirt thinner receptacle.

The embodiment example according to FIG. 3 largely corresponds to the embodiment according to FIG. 2, so that in order to avoid repetitions, reference is made to the above description for FIG. 2, with the same reference signs being used for corresponding details.

A special feature of this embodiment is that a return line 21 also branches off from the coating agent pump 5, which opens into the dirt thinner receptacle 14. A controllable return valve 22 is located in the recirculation line 21, which controls the fluid flow through the recirculation line 21 into the dirt thinner receptacle 14.

During a rinsing process, residues of the coating agent or rinsing agent remaining in the pressure line 4 can be blown out through the return line 21 into the dirt thinner receptacle 14. For this purpose, the return valve 22 is opened. Compressed air is then blown into the pressure line 4 at the compressed air module 19 of the pigging station 1, whereby the compressed air then blows the residues of coating agent and rinsing agent out of the pressure line 4 via the return line 21 into the dirt thinner receptacle 14.

Figure 4:
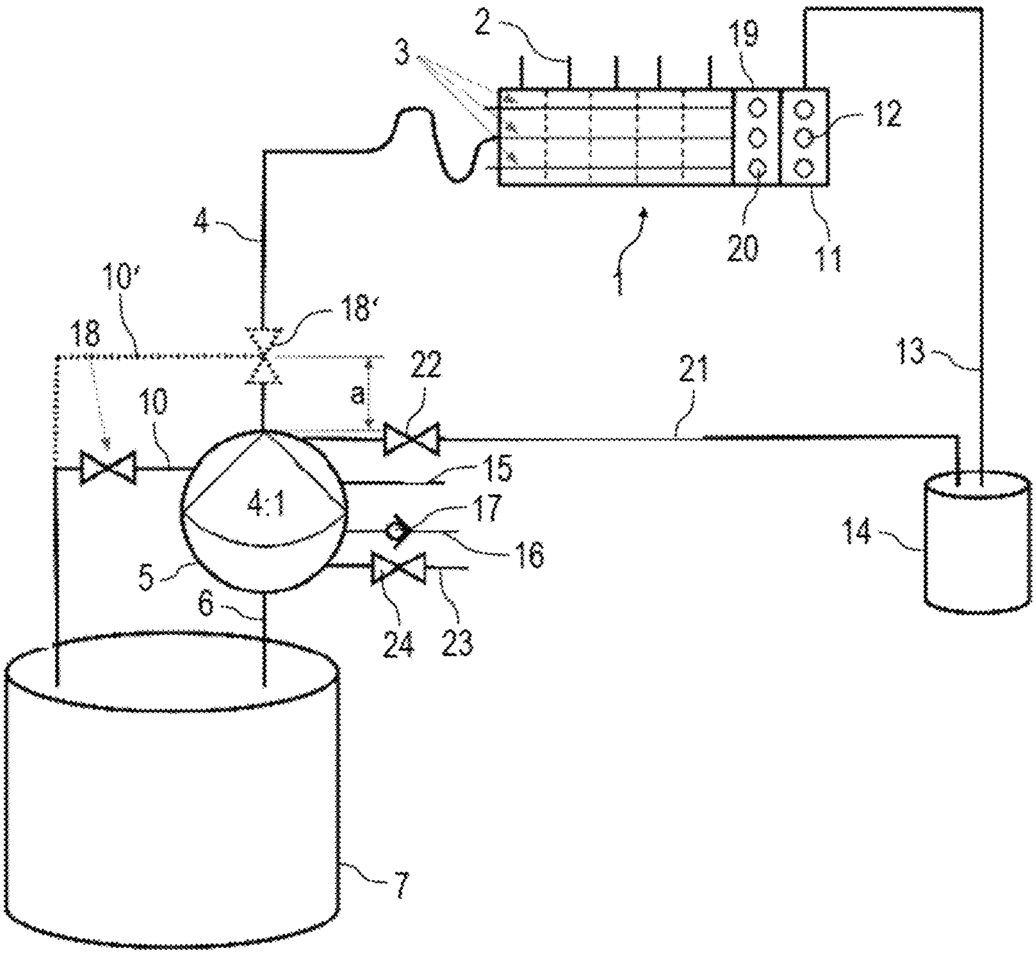
FIG. 4 shows a modification of FIG. 3 with an additional blow-out line for blowing out the inlet section of the coating agent pump.

The embodiment example according to FIG. 4 largely corresponds to the embodiment example according to FIG. 3, so that in order to avoid repetitions, reference is made to the above description for FIG. 3, with the same reference signs being used for corresponding details.

A special feature of this embodiment example is that a further blow-out line 23 is additionally provided, which flows into the inlet section of the coating agent pump 5, wherein a controllable blow-out valve 24 is arranged in the blow-out line 23.

The blow-out line 23 can be used to blow out coating agent remaining in the inlet section of the coating agent pump 5 from the coating agent pump 5 back into the paint supply 7 through the suction line 6. In this way, the coating agent remaining in the inlet section of the coating agent pump 5 can be recovered during a rinsing process. For this purpose, the blow-out valve 24 is simply opened, whereupon compressed air is blown into the inlet section of the coating agent pump 5. The injected compressed air then displaces the coating agent located in the inlet section of the coating agent pump 5, which thus leaves the coating agent pump 5 via the pump inlet and the suction line 6 against the normal direction of flow during coating operation and re-enters the paint supply 7.

Figure 5:
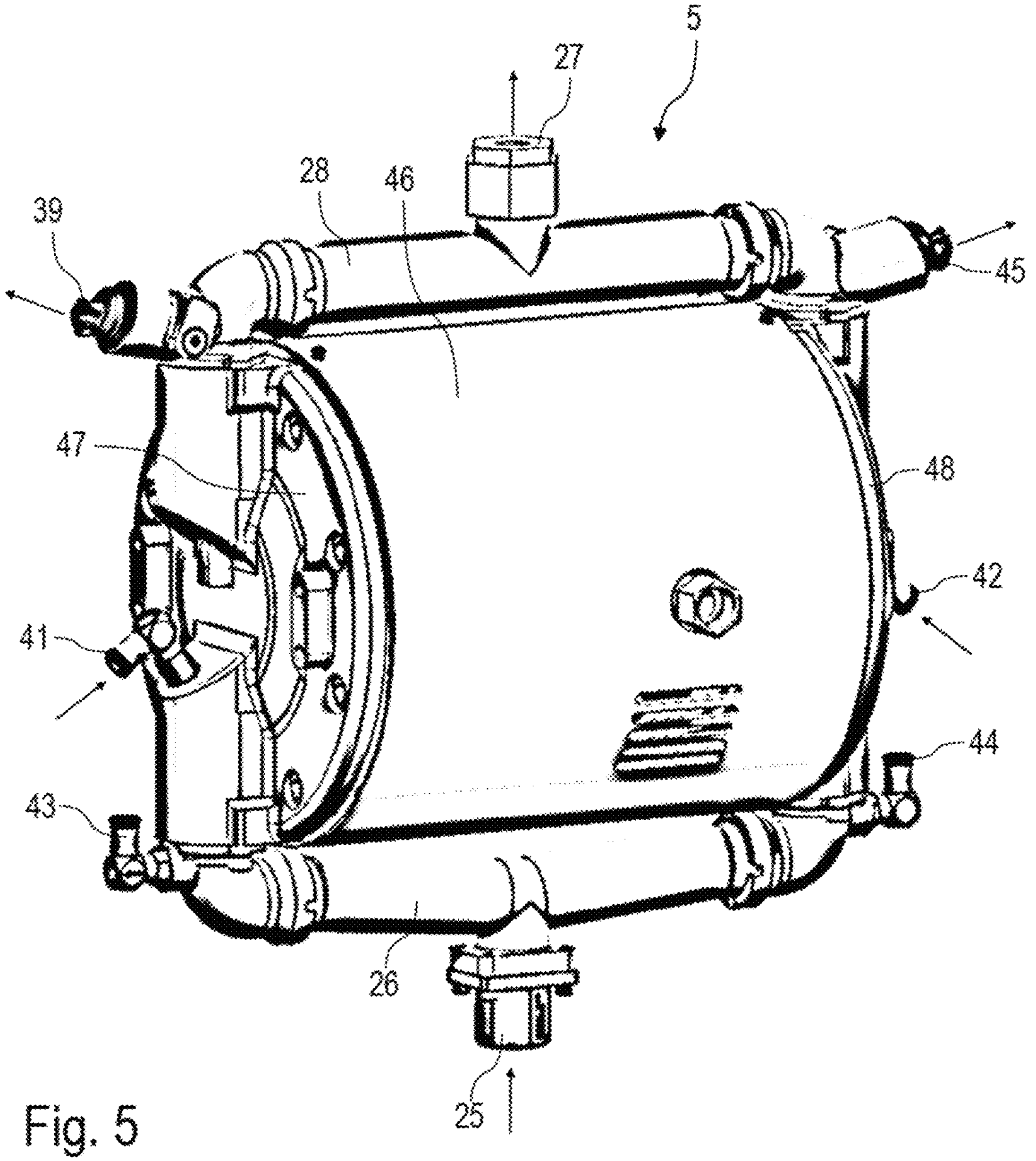
FIG. 5 shows a perspective view of the coating agent pump according to the disclosure.
Figure 6:
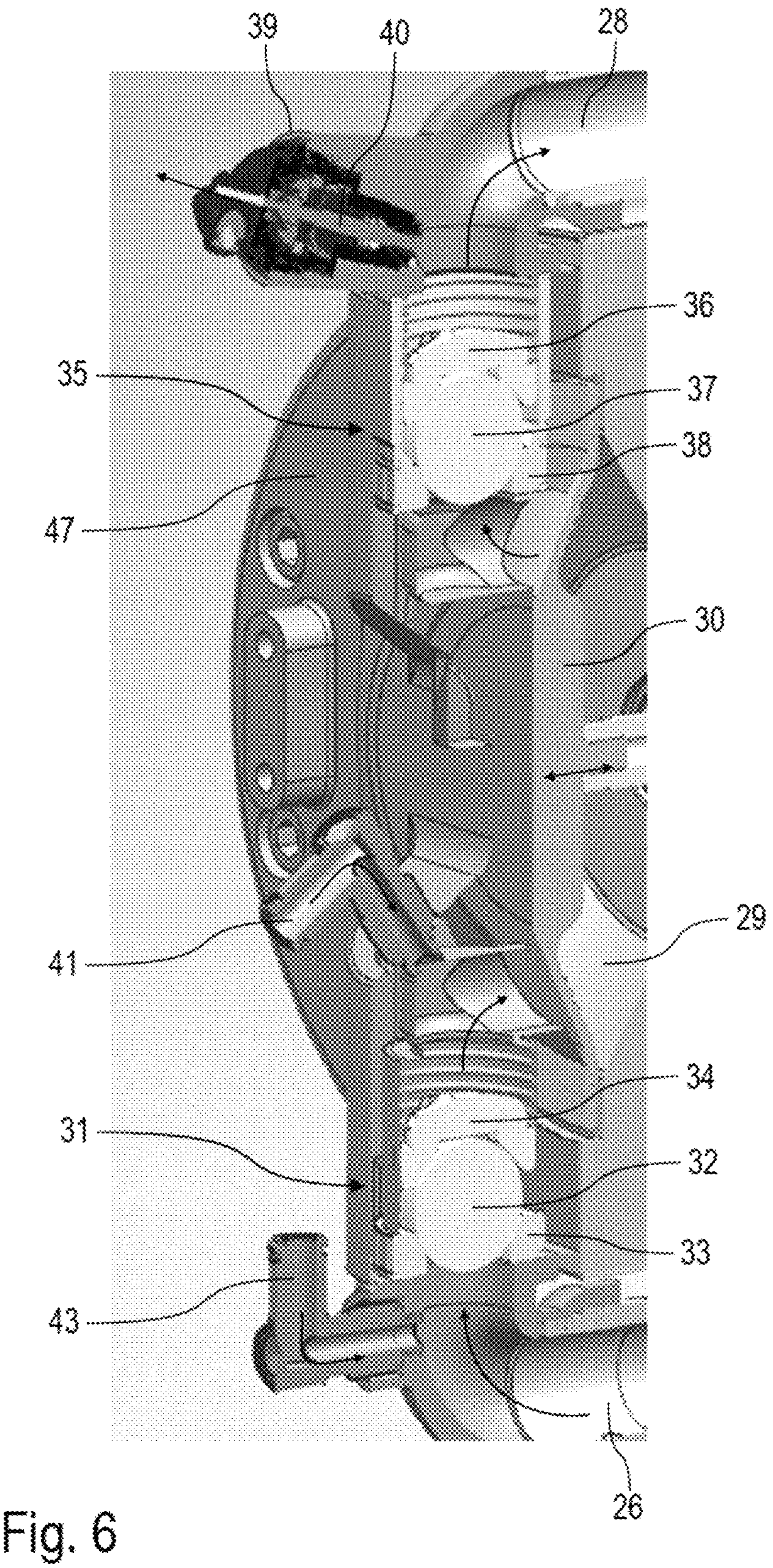
FIG. 6 shows a sectional view of a part of the coating agent pump according to FIG. 5.
Figure 7:
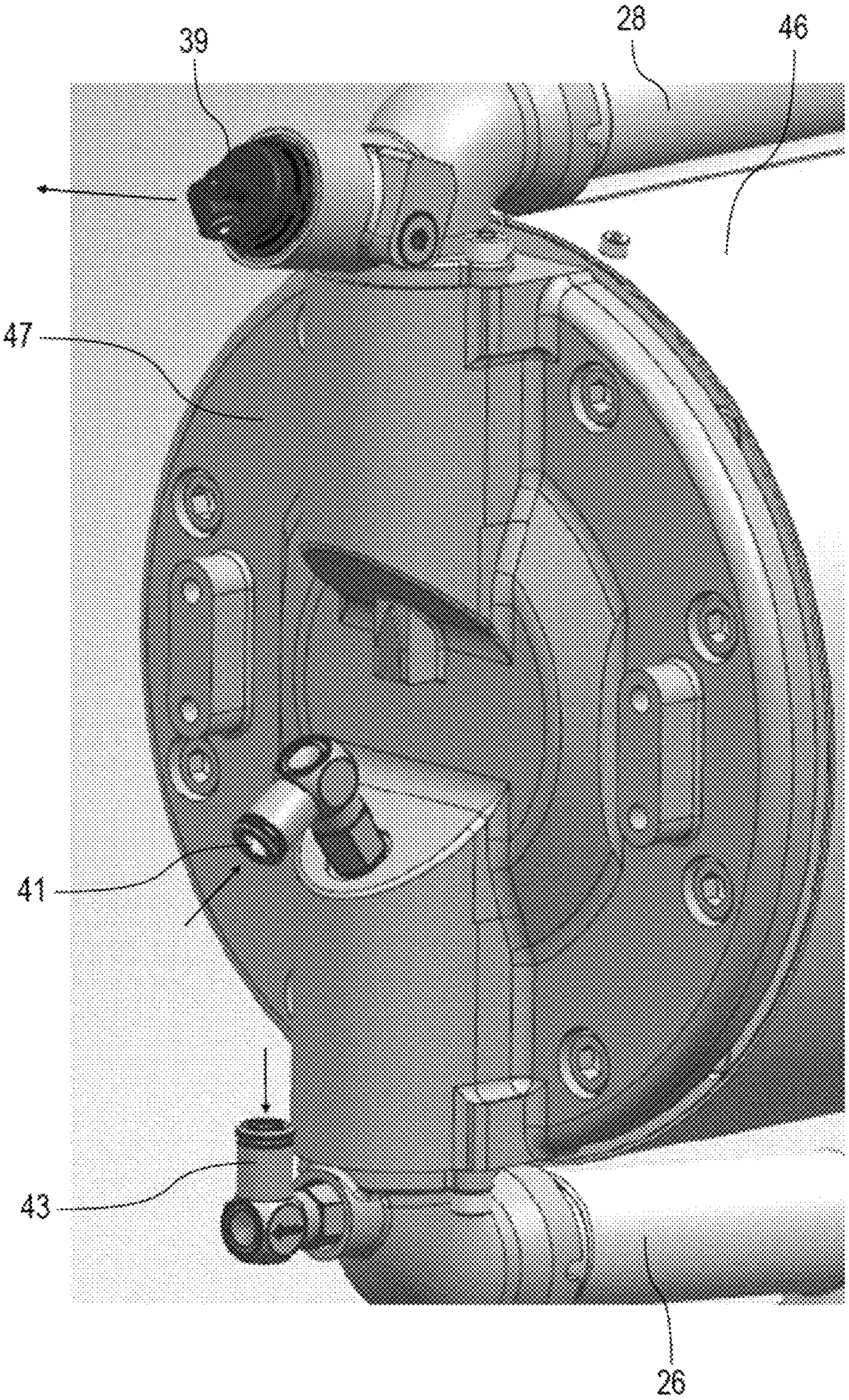
FIG. 7 shows an enlarged view of the coating agent pump from FIGS. 5 and 6 in the area of a housing cover of the pump housing.

FIGS. 5-7 show various views of the coating agent pump 5 according to the disclosure.

Thus, the coating agent pump 5 initially has a pump inlet 25 which draws the coating agent to be conveyed from the paint supply 7 via the suction line 6, whereupon the coating agent flows in the direction of the arrow through the pump inlet 25 into the coating agent pump 5.

From the pump inlet 25, the sucked-in coating agent then enters an inlet section 26 of the coating agent pump 5.

On the outlet side, the coating agent pump 5 has a pump outlet 27 to which the pressure line 4 is connected, the coating agent flowing out of the coating agent pump 5 in the direction of the arrow through the pump outlet 27.

The pump outlet 27 is fed from an outlet section 28 with the coating agent to be pumped.

Between the inlet section 26 and the outlet section 28 of the coating agent pump 5 are two pump chambers, whereby in FIG. 6 only a single pump chamber 29 is shown, in which a pump diaphragm 30 can be deflected in the direction of the double arrow, as is known per se from DE 10 2013 003 620 A1. However, the coating agent pump 5 has two such pump chambers, each with a diaphragm, as is known per se from the prior art.

Between the inlet section 26 and the pump chamber 29 is an inlet valve 31 which controls the flow of coating agent from the inlet section 26 into the pump chamber 29, so that the coating agent flows in the direction of the arrow from the inlet section 26 into the pump chamber 29.

The inlet valve 31 is configured as a check valve and consists essentially of a valve ball 32, a valve seat 33, and a return spring 34, wherein the return spring 34 presses the valve ball 32 sealingly into the valve seat 33. Thus, the inlet valve 31 only allows a coating agent flow from the inlet section 26 in the direction of the arrow into the pump chamber 29, whereas an oppositely directed coating agent flow against the direction of the arrow is blocked by the inlet valve 31.

It should be mentioned here that in the second pump chamber, which is not shown, on the right-hand side in FIG. 5, a further non-return valve is arranged which controls the inflow into the pump chamber there.

An outlet valve 35 is arranged between the outlet section 28 and the pump chamber 29, which controls the coating agent flow from the pump chamber 29 in the direction of the arrow into the outlet section 28.

The outlet valve 35 is also designed as a check valve and consists of a return spring 36, a valve ball 37 and a valve seat 38, whereby the return spring 36 presses the valve ball 37 sealingly into the valve seat 38.

Furthermore, the coating agent pump 5 has a circulation connection 39, wherein the circulation line 10 is connected to the circulation connection 39, which is shown with solid lines in the variant of the disclosure according to FIGS. 2-4.

A controllable circulation valve 40 is integrated into the circulation connection 39, which can selectively release or block the circulation connection 39.

In addition, the coating agent pump 5 has two blow-out connections 41, 42, the blow-out connection 41 being used to blow out the pump chamber 29, while the blow-out connection 42 is used to blow out the opposite pump chamber, which is not shown.

In this case, the blow-out connection 41 opens into the inlet valve 31 downstream of the valve seat 33 with respect to the normal direction of flow in coating operation. This means that when compressed air is supplied via the blow-out connection 41, the compressed air supports the force of the return spring 34 and additionally presses the valve ball 32 into the valve seat 33 in a sealing manner. The inlet valve 31 is then closed and the compressed air can enter the pump chamber 29 through the blow-out connection 41 to blow it out.

The opposite blow-out connection 42 functions in the same manner with respect to the other pump chamber.

Furthermore, the coating agent pump 5 has two blow-out connections 43, 44 which are connected to the inlet section 26 and allow coating agent present in the inlet section 26 to be blown out through the pump inlet 25 and returned to the paint supply 7. For this purpose, compressed air is supplied through the blow-out connections 43, 44 in the direction of the arrow. The coating agent in the inlet section 26 is then pushed back to the paint supply 7 through the pump inlet 25 against the direction of the arrow in FIG. 5.

In addition, the coating agent pump 5 has a separate return connection 45 which is connected to the return line 21 leading to the dirt thinner receptacle 14. The return connection 45 is connected to the outlet section 28 of the coating agent pump 5. Residual coating agent and rinsing agent can be blown out of the pressure line 4 via the return connection 45. For this purpose, compressed air is blown into the pressure line 4 at the pigging station 1. As a result, the residues of coating agent and rinsing agent in the pressure line 4 are pushed against the normal direction of flow into the outlet section 28 of the coating agent pump 5 and then leave the coating agent pump 5 through the return connection 45 to the dirt thinner receptacle 14.

It can further be seen from the drawings that the coating agent pump 5 has a substantially cylindrical pump housing 46 with two lateral housing covers 47, 48.

The two blow-out connections 41, 43 and the circulation connection 39 with the circulation valve 40, the inlet valve 31 and the outlet valve 35 are integrated in the housing cover 47.

The opposite housing cover 48, on the other hand, integrates the two blow-out connections 42, 44 and the return connection 45 together with the inlet and outlet valves there, respectively.

It should be mentioned here that the two housing covers 47, 48 are each made of stainless steel and are castings.

In the following, the flow diagram according to FIG. 8 will now be described, which illustrates a part of a flushing process.

In a first step S1, the circulation valve 18 is first opened so that the coating agent remaining in the pressure line 4 can be fed back through the circulation line 10 into the paint supply 7.

For this purpose, in a step S2, compressed air is fed into the pressure line 4 at the pigging station 1.

This compressed air pushes the coating agent in the pressure line 4 through the opened circulation valve 18 and through the circulation line 10 back into the paint supply 7, so that this portion of the coating agent is recovered and does not generate any coating agent loss.

In the following, the flow chart according to FIG. 9 will now be described, which also illustrates a part of a rinsing process. In this part, the residual coating agent and rinsing agent in the pressure line 4 are disposed of.

For this purpose, the return valve 22 in the return line 21 is first opened in a step S1.

In a step S2, compressed air is then again fed into the pressure line 4 at the pigging station 1. This compressed air then pushes the residues of the coating agent and the rinsing agent located in the pressure line 4 first into the outlet section 28 of the coating agent pump 5 and there via the opened return valve 22 and the return line 21 into the dirt thinner receptacle 14.

Figure 10:
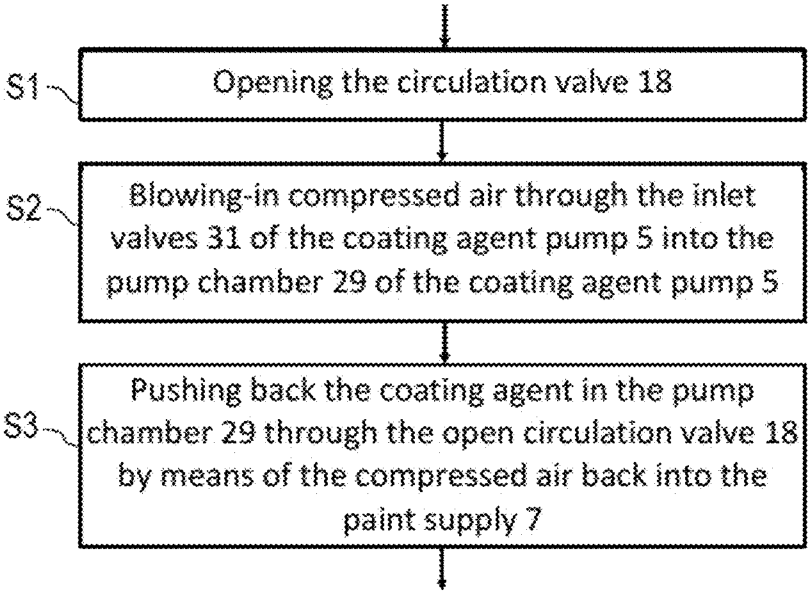

In the following, the flow diagram according to FIG. 10 is now described, which illustrates a further part of a rinsing process. In this part, the coating agent present in the pump chamber 29 of the coating agent pump 5 is partially recovered.

For this purpose, in a first step S1, the circulation valve 18 is first opened.

In a step S2, compressed air is then blown back into the coating agent pump 5 via the blow-out connections 41, 42. This compressed air penetrates into the pump chamber 29 or into the opposite second pump chamber and pushes the coating agent located therein first into the outlet section 28 of the coating agent pump 5 and from there through the circulation connection 39 into the circulation line 10 and back into the paint supply 7. In this way, part of the coating agent remaining in the pump chamber 29 can be recovered.

Figure 11:
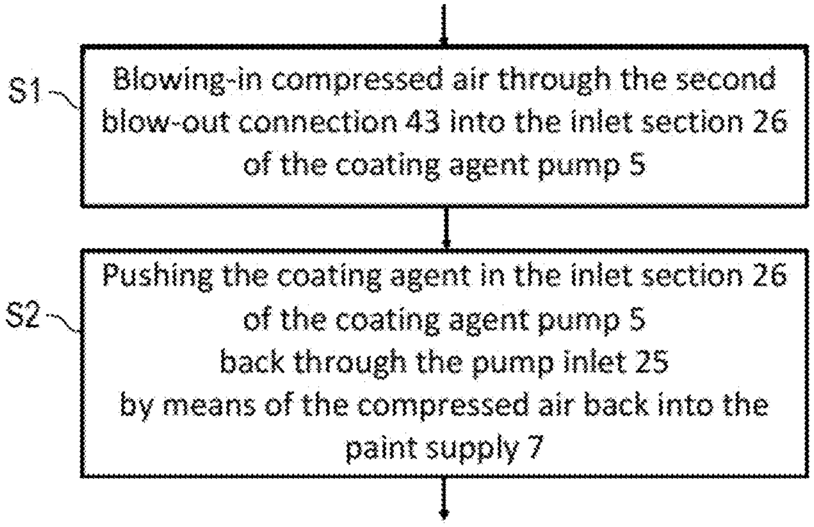

In the following, the flow diagram according to FIG. 11 is described, which also illustrates a part of a rinsing process. In this part of the rinsing process, the coating agent is partially recovered which is located in the inlet section 26 of the coating agent pump 5.

In a first step S1, compressed air is blown into the inlet section 26 of the coating agent pump 5 through the second blow-out connection 43 or 44.

In a second step S2, the injected compressed air then pushes the coating agent residues remaining in the inlet section 26 through the pump inlet 25 and the suction line 6 back into the paint supply 7.

Figure 8:
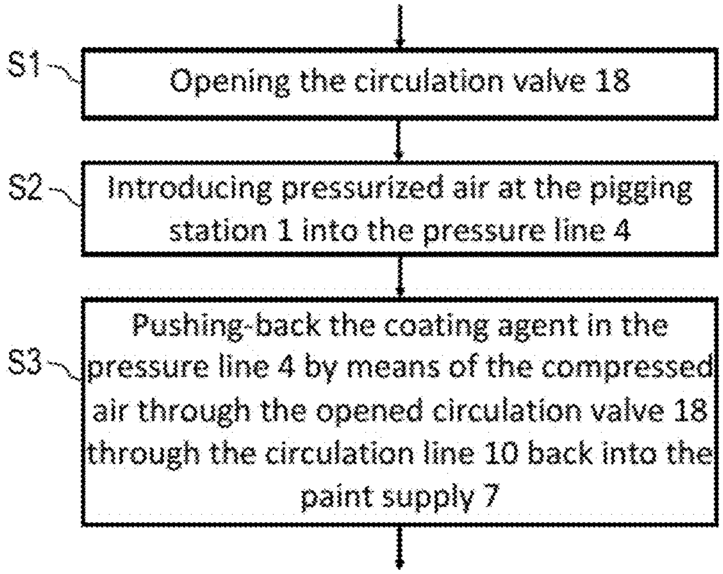
FIG. 8 shows a flow diagram to illustrate the operating method according to the disclosure.
Figure 9:
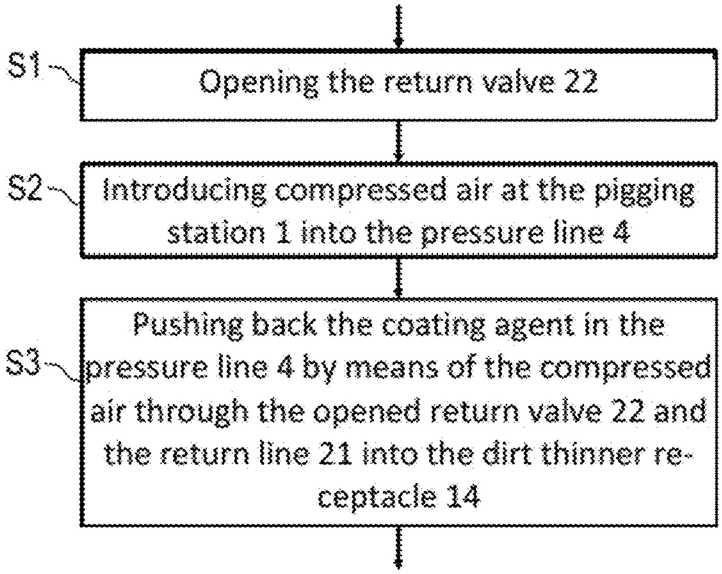
FIGS. 9-11 show further flow diagrams to illustrate further rinsing processes within the scope of the operating method according to the disclosure.

Preferably, the rinsing processes according to FIGS. 8-11 are carried out one after the other, and preferably in the following order:

1. blowing out the coating agent in the pressure line 4 through the circulation line 10 back into the paint supply 7 according to FIG. 8.
2. blowing out the coating agent remaining in the pump chamber 29 through the circulation line 10 back into the paint supply 7 as shown in FIG. 10.
3. blowing out the coating agent remaining in the inlet section 26 of the coating agent pump 5 through the pump inlet 25 back into the paint supply 7 as shown in FIG. 11.
4. blowing out residual coating agent and rinsing agent from the pressure line 4 through the return line 21 into the dirt thinner receptacle 14 according to FIG. 9.

The disclosure is not limited to the preferred embodiments described above. Rather, a large number of variants and variations are possible which also make use of the idea of the disclosure and therefore fall within the scope of protection. In particular, the disclosure also claims protection for the subject-matter and the features of the sub-claims independently of the claims referred to in each case and in particular also without the characterizing features of the main claim. The disclosure thus encompasses various aspects of the disclosure which enjoy protection independently of one another.

LIST OF REFERENCE SIGNS

1 Pigging station
2 Piggable supply lines from the pigging station to the applicators
3 Central lines of the pigging station
4 Pressure line from the coating agent pump to the sampling point
5 Coating agent pump
6 Suction line of the coating agent pump
7 Paint supply
8 Circulation module of the pigging station with circulation connections and circulation valves
9 Circulation connections of the circulation module
10 Circulation line
11 Circulation module of the pigging station with recirculation connections and recirculation valves
12 Return connections of the return module
13 Return line
14 Dirt thinner receptacle
15 Control line for coating agent pump
16 Blow-out line for coating agent pump
17 Blow-out valve
18 Recirculation valve
19 Compressed air module
20 Compressed air connections
21 Return line
22 Return valve
23 Blow-out line
24 Blow-out valve
25 Coating agent pump inlet
26 Coating agent pump inlet section
27 Coating agent pump outlet
28 Coating agent pump outlet section
29 Pump chamber of the coating agent pump
30 Pump diaphragm
31 Inlet valve (check valve) between inlet section and pump chamber
32 Valve ball of the inlet valve
33 Valve seat of the inlet valve
34 Inlet valve return spring
35 Outlet valve (check valve) between pump chamber and outlet section
36 Return spring of the outlet valve
37 Valve ball of the outlet valve
38 Valve seat of the outlet valve
39 Recirculation connection
40 Circulation valve
41, 42 Blow-out connections
43, 44 Blow-out connections
45 Return connection
46 Pump housing
47, 48 Housing cover
a Line length of the discharge line between the coating agent pump and the recirculation valve

The invention claimed is:

1. A coating agent pump for conveying a coating agent in a coating installation, comprising:
a double diaphragm pump with two pump chambers,
a pump inlet for receiving the coating agent to be conveyed,
an inlet section connected to both pump chambers which is fed with the coating agent from the pump inlet
a pump outlet for discharging the coating agent to be conveyed, and
an outlet section connected to both pump chambers feeding the pump outlet with the coating agent to be delivered,
a circulation connection on the outlet section for discharging the coating agent into a circulation line which leads back to a paint supply, the circulation connection of the coating agent pump
1) being provided in addition to the pump inlet and the pump outlet,
2) is connected to the outlet section of the coating agent pump, and
3) is fed from the outlet section of the coating agent pump with the coating agent to be returned.

2. The coating agent pump according to claim 1, further comprising:
a) a return connection on the outlet side for discharging residues of the coating agent and/or a rinsing agent into a return line which leads into a dirt thinner receptacle, wherein the return connection of the coating agent pump is
a1) being provided in addition to the pump inlet, the pump outlet and the recirculation connection,
a2) is connected to the outlet section of the coating agent pump, and
a3) is fed from the outlet section of the coating agent pump with the coating agent to be returned.

3. The coating agent pump according to claim 2, wherein the coating agent pump is a positive displacement pump that includes:
two movably driven diaphragms, each of which is arranged in one of the two pump chambers,
a drive for moving the diaphragms for pumping the coating agent,
an inlet valve integrated in the coating agent pump between the inlet section and each of the pump chambers,
1) as a non-return valve which releases a coating agent flow from the inlet section into the pump chamber and blocks a coating agent flow from the pump chamber into the inlet section,
2) with a tension spring, a valve body and a valve seat, the tension spring pressing the valve body sealingly into the valve seat in a closed position,
an outlet valve integrated in the coating agent pump between each of the pump chambers and the outlet section,
1) as a non-return valve which releases a coating agent flow from the pump chamber into the outlet section and blocks a coating agent flow from the outlet section into the pump chamber,
2) with a tension spring, a valve body and a valve seat, wherein the tension spring presses the valve body sealingly into the valve seat in a closed position.

4. The coating agent pump according to claim 3, further comprising:
a) at least one first blow-out connection for blowing out the pump chambers with compressed air, the first blow-out connection opening into the pump chambers,
a1) via the inlet valves designed as a non-return valve,
a2) with respect to the coating agent flow from the inlet section through the inlet valves into the pump chamber downstream of the valve seats of the inlet valves,
a3) in such a way that the compressed air supplied via the first blow-out connection presses the valve bodies of the inlet valves, which is are designed as a non-return valve, into the closed position, b) at least one first blow-out valve integrated in the coating agent pump for controlling the compressed air flow through the first blow-out connection into the pump chambers, which releases a compressed air flow through the first blow-out connection into the pump chambers and blocks a compressed air flow from the pump chambers through the first blow-out connection.

5. The coating agent pump according to claim 1, further comprising:

a) at least one inlet-side second blow-out connection for blowing coating agent out of the inlet section of the coating agent pump by means of compressed air, the second blow-out connection opening into the inlet section of the coating agent pump, and b) a controllable second blow-out valve integrated in the coating agent pump for controlling the flow of compressed air through the second blow-out connection into the inlet section of the coating agent pump.

6. The coating agent pump according to claim 1, wherein a) the coating agent pump includes:

a1) two inlet valves, each connecting one of the two pump chambers to the inlet section of the coating agent pump, a2) two outlet valves, each connecting one of the two pump chambers to the outlet section of the coating agent pump, a3) two movably driven pump diaphragms, each of which is arranged in one of the two pump chambers, a4) two of the first blow-out connections for blowing out each one of the two pump chambers, a5) two of the first blow-out valves for controlling the flow of compressed air through the first blow-out connections into one of the two pump chambers in each case, b) the double diaphragm pump has a pump housing with two opposing housing covers, c) the following components are structurally integrated in each of the two housing covers:

c1) one of the two inlet valves, c2) one of the two outlet valves.

* * * * *